United States Patent [19]

Seabrook et al.

[11] Patent Number: 5,035,448

[45] Date of Patent: Jul. 30, 1991

[54] SWIVEL OR ROTATING JOINT

[75] Inventors: Colin Seabrook; David Makin, both of North Humberside, England

[73] Assignee: J. H. Fenner & Co. Limited, North Humberside, England

[21] Appl. No.: 463,432

[22] Filed: Jan. 11, 1990

[30] Foreign Application Priority Data

Jan. 11, 1989 [GB] United Kingdom ............... 8900577

[51] Int. Cl.⁵ .............................................. F16L 7/00
[52] U.S. Cl. .................................... 285/94; 285/276; 184/31
[58] Field of Search .................... 285/94, 281, 276; 184/31

[56] References Cited

U.S. PATENT DOCUMENTS

| | | | |
|---|---|---|---|
| 2,434,459 | 1/1948 | Dahlstrand | 184/31 X |
| 4,234,216 | 11/1980 | Swanson et al. | 285/94 X |
| 4,789,188 | 12/1988 | Seabrook et al. | 285/94 |

Primary Examiner—Dave W. Arola
Attorney, Agent, or Firm—Burns, Doane, Swecker & Mathis

[57] ABSTRACT

A swivel joint for interconnecting two lengths of pipe, comprises an inner annular member adapted, in use, to be connected to a first length of pipe and an outer annular member co-axial with the inner annular member and adapted, in use, to be connected to a second length of pipe, and a bearing arrangement locating the inner and outer members for relative rotary movement with respect to one another. A lubricant reservoir is connected to the bearing arrangement, and a pump drive driven by relative rotary movement between the inner and outer annular members pumps lubricant from the lubricant reservoir to the bearing arrangement. The lubricant reservoir comprises a collapsible hose, and the pump device (42) comprises system for effecting a peristaltic action in the hose as a result of relative rotary movement of the inner and outer annular members, thereby causing lubricant to be displaced from the hose towards the bearing arrangement.

7 Claims, 3 Drawing Sheets

SWIVEL OR ROTATING JOINT

The present invention relates to a swivel or rotating joint of the type employed in a pipeline to allow relative movement between two sections of pipe.

A swivel joint is typically used as a means of connecting together the ends of two pipes in a way which allows relative rotary movement therebetween. Typically such movement is oscillatory and of a magnitude of 1 to 2 degrees, but it can be a complete revolution of one pipe with respect to the other. A known swivel joint comprises an inner member and an outer member which are adapted to be secured to the ends of respective pipes. A bearing or bearings are disposed between the inner and outer members to support same with respect to one another. The bearing or bearings are usually tapered roller thrust bearings and are received within a chamber filled with a bearing lubricant.

As a consequence of the limited movement of the joint the bearings can run dry of lubrication in discrete areas. In this respect, the limited movement of the joint means that there is nothing to circulate the lubricant within the bearing chamber. This problem is exacerbated where the pipe run is continuously horizontal or vertical since the lubricant tends to settle in the lowest part of the bearing chamber.

Swivel joints have been proposed which mitigate the problems described above by incorporating a pump for circulating the lubricant within the chamber which is driven by relative movement between the inner and outer members. An example of such a swivel joint is disclosed in published European Application No. 0207746 and shows an eccentric ring which is disposed in an annular chamber between the inner and outer members. A ratchet drive mechanism ensures that relative rotary motion of the inner and outer members rotates the eccentric ring within the annular chamber, thereby forcing lubricant out of the annular chamber and into the bearings.

Although the eccentric ring will certainly pump lubricant round the bearings it is not capable of developing high pressures. Thus, after a period of time in use, during which the lubricant tends to become thick with dirt and loses its viscosity, the eccentric ring ceases to pump it effectively to the bearings, especially where the lubricant used is grease. As a consequence, the old lubricant must be replaced at regular intervals. In order to do this the swivel joint must be removed from between the two pipes and disassembled to allow the old grease to be cleaned away and fresh grease inserted in the bearing chamber. As will be readily appreciated this is a troublesome and time consuming exercise, and whilst the swivel joint is being cleaned the transmission of fluids and gases through the two pipes must be interrupted.

Moreover, because the ratchet mechanism will only rotate the eccentric ring within the annular chamber when the relative rotary movement of the inner and outer members with respect to one another exceeds the pitch of the ratchet teeth of the ratchet mechanism, slight relative rotary movements of the inner and outer members will not rotate the eccentric ring and will be lost as far as pumping lubricant to the bearings is concerned. It is an object of the present invention to provide a swivel joint which is capable of pumping lubricant to the bearings between the inner and outer members under much greater pressure than is possible with known swivel joints.

It is a further object of the present invention to provide a swivel joint in which very low amplitude relative rotary movement of the inner and outer members will result in lubricant being pumped to the bearings.

According to a first aspect of the present invention there is provided a swivel joint for interconnecting two lengths of pipe, comprising an inner annular member adapted, in use, to be connected to a first length of pipe and an outer annular member co-axial with the inner annular member and adapted, in use, to be connected to a second length of pipe, bearing means locating the inner and outer members for relative rotary movement with respect to one another, a lubricant reservoir, means for connecting the lubricant reservoir to the bearing means, and pump means driven by relative rotary movement between the inner and outer members for pumping lubricant from the lubricant reservoir to the bearings, wherein the lubricant reservoir comprises a collapsible hose, and the pump means comprises means for effecting a peristaltic action in the hose as a result of relative rotary movement of the inner and outer members, thereby causing lubricant to be displaced from the hose towards the bearing means.

Preferably, the pump means comprises an annular ring which is disposed between the inner and outer annular members, and is rotatably driven by relative rotary motion of the same, which annular ring carries means for effecting localized closure of the internal bore of the hose. As the annular ring is rotated each region of localized closure is moved along the collapsible hose and causes a peristaltic action which displaces lubricant from the hose towards the bearing.

Preferably, the means for effecting localized closure of the collapsible hose comprises at least one roller which acts on the surface of the hose. Alternatively, the said means may take the form of an eccentric cam.

Preferably, the said annular ring is rotatably driven by a non-return drive means.

The non-return drive means may take the form of a ratchet drive mechanism, and in this respect the inner and/or outer circumferences of the annular ring are provided with ratchet teeth against which a respective ratchet pin is located with respect to the inner and/or outer annular members. It will be readily understood that as the inner and outer annular members are rotated relative to one another, the ratchet mechanism indexes the annular ring and as a result the means for effecting localized closure of the hose is moved circumferentially along the hose.

However, in a preferred embodiment the said non-return drive means comprises at least one roller bearing located between the outer circumference of the inner annular member and inner circumference of the annular ring in a tapered slot provided with resilient biasing means which acts to bias the said roller bearing out of the tapered slot, and at least one roller bearing located between the outer circumference of the annular ring and an internal circumference of the outer annular member, or, in the alternative, of a fixed reaction ring carried by the outer annular member, in a tapered slot tapered in the opposite direction to the first and provided with resilient biasing means to bias the said roller bearing out of the tapered slot in the opposite direction to the first roller bearing. As the outer annular member rotates in one direction relative to the inner annular member one or other of the rollers is forced out of its tapered slot by the combined action of the resilient biasing means and the movement in the direction of the resilient biasing means of the annular member against which is biased. As a consequence the roller bearing effects a wedging action between the annular ring and the said annular member, locking the two together and ensuring that the annular ring rotates with the said annular member. At the same time the other roller bearing is forced into its tapered slot against the action of the resilient biasing means by the movement in the opposite direction to the resilient biasing means of the annular member against which it is biased. As a consequence the said annular member is free to rotate relative to the annular ring and hence to the other annular member locked thereto. Of course, movement in the opposite direction reverses the action of the roller bearings so that the annular ring is locked to the formerly free moving annular member and freely rotates with respect to the annular member to which it was formerly locked.

It will be appreciated that with this non-return drive means any movement of the outer annular member relative to the inner annular member will cause the annular member to rotate and lubricant to be pumped to the bearing means. There is virtually no lost motion and certainly not the same degree of lost motion as there would be with a conventional ratchet drive mechanism.

In the embodiment of the present invention described hereinbelow with reference to the accompanying drawings the said tapered slots are conveniently shown in the outer circumference of the inner annular member and the outer circumference of the annular ring. However, it will be appreciated that the slots may be provided in either one or both of each pair of facing circumferential surfaces. As a further alternative, it is envisaged that the resiliently biased rollers and the tapered slots may be provided between axially facing surfaces of the inner and outer annular members and the annular ring rather than the facing circumferential surfaces.

Preferably, the said means for connecting the lubricant reservoir or hose to the bearing means comprises a system of bores or ducts in the outer annular member which link the bearing means to the lubricant reservoir. This system of bores is connected to both ends of the lubricant reservoir so that lubricant can be pumped through the system in both directions with equal effectiveness. Preferably, the swivel joint is lubricated with oil, and closeable filling and drainage holes are connected to the system of bores to facilitate drainage of exhausted lubricant and replacement with fresh lubricant. It will be readily understood that when the lubricant needs to be replaced it is a simple matter to drain off the exhausted oil and refill the swivel joint. While this is taking place the swivel joint need not be removed from between the ends of the two pipes which it interconnects and hence there is virtually no down time.

The peristaltic action of collapsible hose caused by relative rotational movement of the inner and outer annular members is capable of developing pressures of the order of 10 p.s.i. This is an improvement on the pumps of known swivel joints and is certainly adequate to pump lubricant to all the bearing means.

In a swivel joint according to a second aspect of the present invention the collapsible hose defining the lubricant reservoir can be dispensed with and the pump means can be used to drive the lubricant from a lubrication chamber. In this respect, an eccentric ring or cam pump is provided in the annular chamber vacated by the collapsible hose. The eccentric ring is connected to the annular ring and as this rotates it causes the eccentric ring to sweep the annular chamber and force lubricant towards the bearing means.

An embodiment of the present invention will now be described, by way of sample, with reference to the accompanying drawings, in which.

Figure 1:
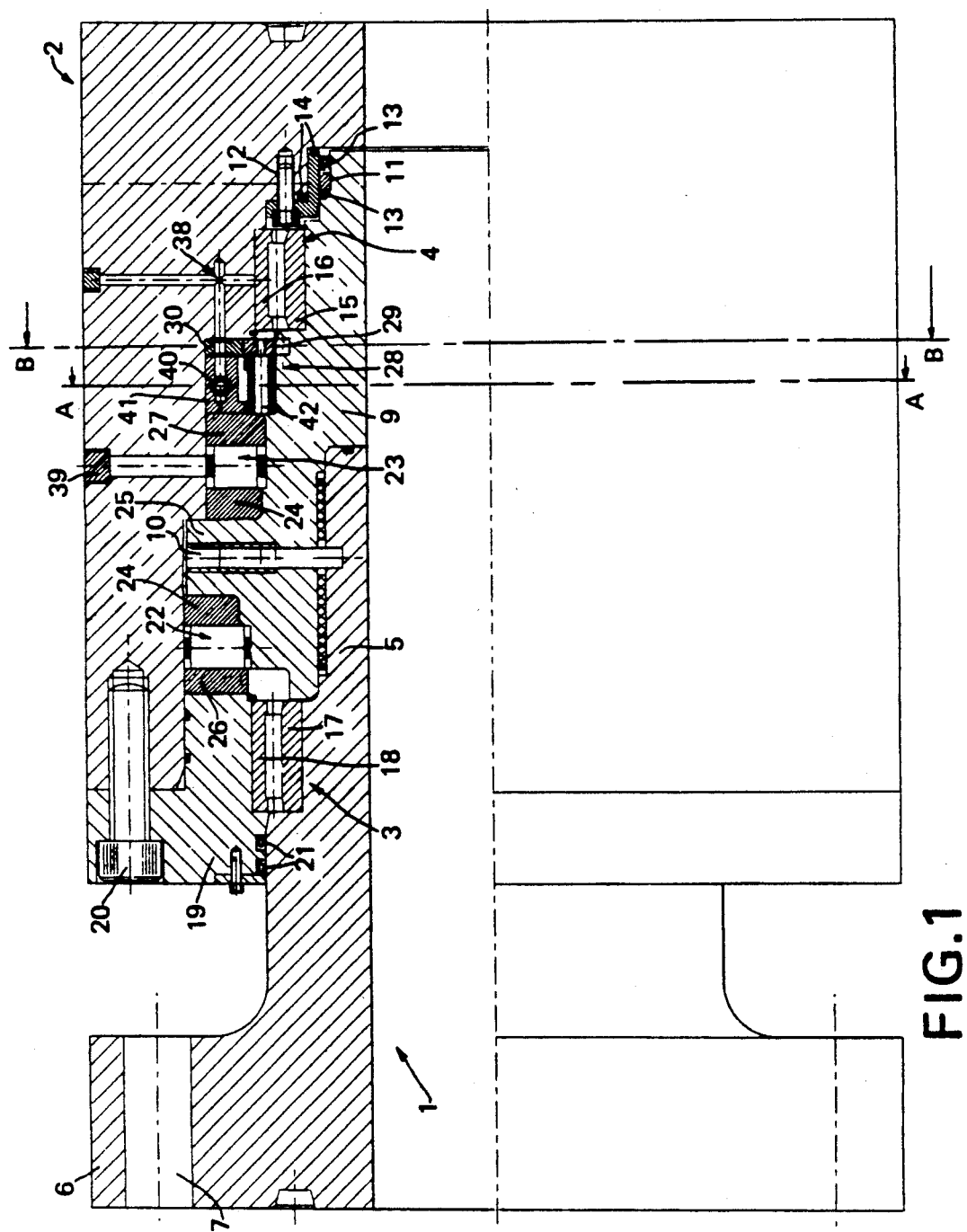
FIG. 1 is a sectional view of the upper half of a swivel joint in accordance with the present invention.

Referring to FIG. 1 of the accompanying drawings there is shown a swivel joint which comprises an inner member or sleeve 1, and an outer member or housing 2 which are located for relative rotary motion with respect to one another by bearing means consisting of two radial bearings 3 and 4. The inner member 1 comprises a tubular portion 5 and a circumferential flange 6. The flange 6 has a plurality of equi-spaced holes 7 therein which allow the inner member 1 to be secured to the end of a first pipe. The outer member 2 has a plurality of equi-spaced tapped blind bores (not shown) in the end thereof which allows outer member 2 to be secured to the end of a second pipe which is to be connected to the first by the swivel joint.

The tubular portion 5 of the inner member 1 carries at its end a bearing support ring 9. This is threaded onto the tubular portion 5 and is secured in position by locking screws or pins 10 (only one of which is shown) each of which pass through a screw threaded hole in the bearing support ring 9 to engage in a respective blind hole in the tubular portion 5. Between the outer surface of the opposite end of the bearing support ring 9 and the internal surface of the outer member 2 is a seal ring 11. The seal ring 11 is of substantially L-shaped section and is secured to a perpendicular face of an internal recess in the outer member 2 by one or more locking screws 12. Two seals 13 are provided between the facing surfaces of the seal ring 11 and the bearing support ring 9, and two further seals 14 are provided between the bearing support ring 9 and the outer housing. These seals 13 and 14 are conveniently annular lip seals.

The inner and outer races 15 and 16 of the radial bearing 4 are each accommodated in a respective recess in the bearing support ring 9 and the outer member 2. The inner race 17 of the bearing 3 is accommodated in a recess in the tubular portion 5, while the outer race 18 is accommodated in a recess in an annular shear plate 19 which is secured to the outer member 2 by bolts 20 (only one of which is shown). The annular shear plate 19 serves to allow axial clearance of the bearing 3 via the bolts 20 and a shim may be inserted between the axial end face of the bearing outer load plate and the annular shear plate 19 to give the required bearing axial clearance. The annular shear plate 19 also serves to close off the swivel gap between the outer housing 2 and the tubular portion 5. In this respect, the annular shear plate 19 accommodates annular seals 21 which lie between the facing surfaces of the annular shear plate 19 and the tubular portion 5. These annular seals 21 are lip seals and face in opposite directions to provide an effective fluid tight seal.

Also interposed between the outer member 2 and the bearing support ring 9 are two twist bearings 22 and 23 which serve to allow the swivel joint to accommodate a certain amount of lateral movement of one pipe relative to the other. The inner races 24 of these bearings 22 and 23 are each supported against a respective side of a circumferential spigot or flange 25 of the bearing support ring, while the outer race 26 of bearing 22 is supported against the inner end of the shear plate 19 and the outer race 27 of bearing 23 is supported against a pump arrangement, generally indicated by reference 28. The pump arrangement 28 is located in an annular recess defined between the bearing support ring 9 and the internal bore of the outer member 2. This pump arrangement 9 will not be described in detail.

Figure 2:
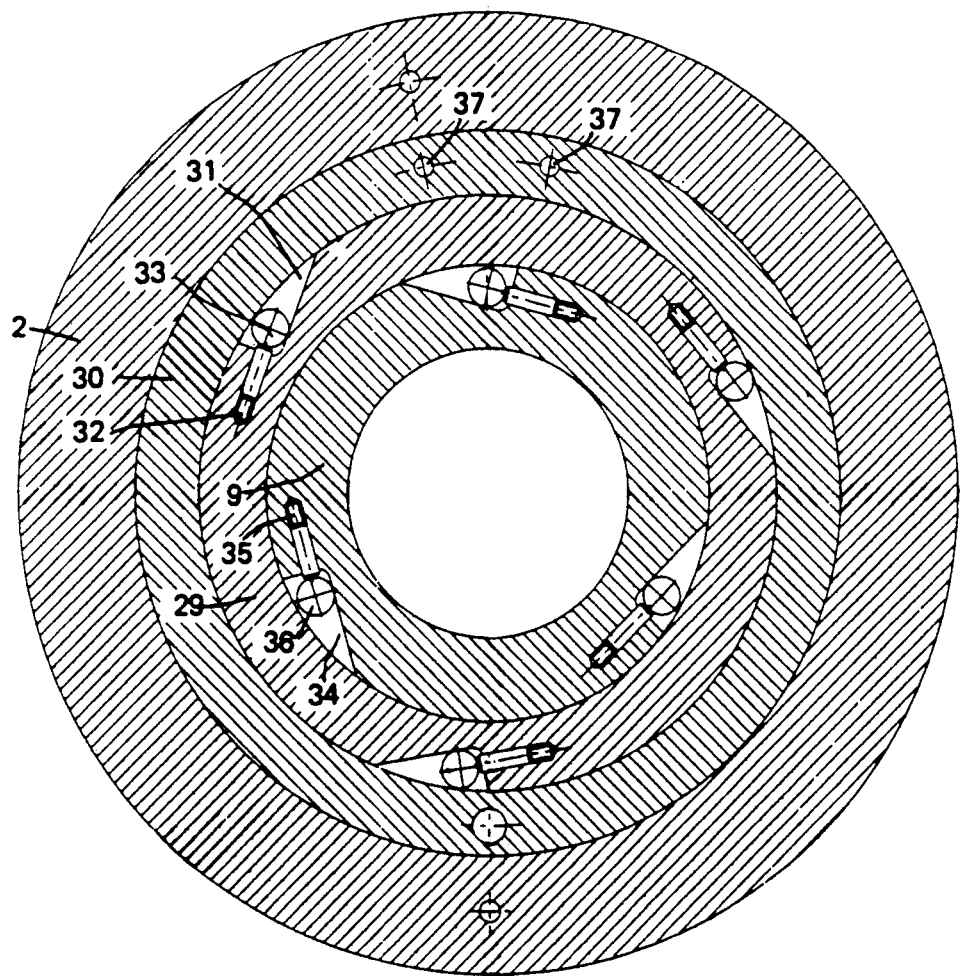
FIG. 2 is a cross-sectional view on line II—II of FIG. 1, though not shown to scale.

Referring now to FIGS. 1 and 2 of the accompanying drawings the pump arrangement 28 comprises an annular ring 29 which is received between the outer circumference of the bearing support ring 9 and a reaction ring 30 which is fixed in position relative to the outer housing 2. The annular ring 29 is rotatable about the bearing support ring 9. A plurality of equi-spaced tapered slots 31 are provided in the outer circumference of the annular ring 29 and in each of these there is located a spring 32 and a roller bearing 33. Each spring 32 resiliently biases a roller bearing 33 out of the tapered slot 31 and into engagement with the internal circumference of the reaction ring 30. A plurality of equi-spaced tapered slots 34 are also provided in the outer circumference of the bearing support ring 9 and in each of these there is also located a spring 35 and a roller bearing 36. Again, each spring 35 resiliently biases a roller bearing 36 out of the tapered slot 34 and into engagement with the internal circumference of the annular ring 29. However, the roller bearings 36 are biased in the opposite direction to the roller bearings 33. That is to say, the roller bearings 33 are biased in a clockwise direction relative to the annular ring 29, while the roller bearings 36 are biased in an anti-clockwise direction relative to the annular ring 29. Two holes 37 are provided through the reaction ring 30 and each of these communicate at one end with a respective end of a system of bores which interconnect the radial bearings 3 and 4 and the twist bearings 22 and 23. In FIG. 1, only that part of the system of bores which connects with the radial bearing 4 is shown, generally designated by reference 38. The lubrication system also comprises a filling hole 39 through which the lubrication system can be filled with oil and a drainage hole (not shown) through which exhausted lubricant can be drained. The filling and drainage holes are blanked off by removable plugs. The other ends of the holes 37 each communicate with a respective end of a collapsible hose 40 which can also be seen in FIG. 3. For the purposes of this description the collapsible hose can be regarded as providing a lubricant reservoir, though it should be understood that lubricant is, of course, present through the lubrication system.

Figure 3:
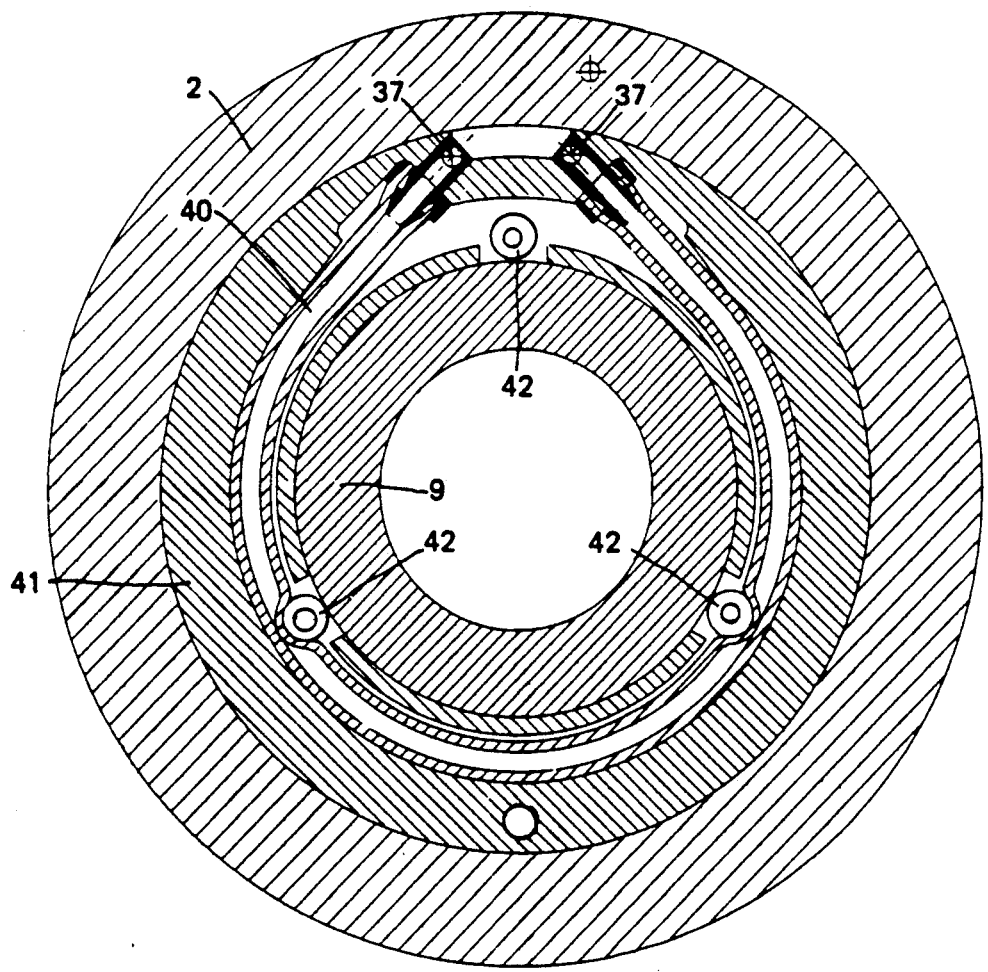
FIG. 3 is a cross-sectional view on line III—III of FIG. 1 though not shown to scale.

Referring now to FIGS. 1 and 3 of the accompanying drawings it will be seen that between its free ends (where it connects with the holes 37) the collapsible hose 40 defines a loop and is effectively co-axial with the inner and outer members 1 and 2. This loop is shaped by and supported on the inner circumference of an annular support ring 41. The outer circumference of the annular support ring 41 is in contact with the internal bore of the outer member 2 and is fixed in position with respect thereto. In use the collapsible hose 40 is filled with lubricant to be circulated to the bearings 3, 4, 22 and 23. Disposed radially inward of the collapsible hose 40 and equi-spaced around the annular ring 29 are three rollers 42, each of which is connected to the annular ring 29. Each of these rollers is in close contact with the collapsible hose 40 and causes localized compression of the collapsible hose 40 against the annular support ring 41.

The roller bearings 33 and 36 define an indexing mechanism and upon relative rotation of the inner member 1 with respect to the outer member 2 the indexing mechanism causes the annular ring to rotate about its central axis. In this respect, as the inner member 1 rotates clockwise with respect to the outer member 2, each of the roller bearings 36 slide up the tapered slot 34 under the action of the spring 35 and become wedged between the bearing support ring 9 and the annular ring 29, thereby locking the two together. At the same time each of the roller bearings 33 are depressed into the tapered slot 31, against the resilient biasing action of the spring 32, by the inner circumference of the reaction ring 30 where they are able to freely rotate and allow the outer member 2 to rotate about the annular ring 29, and thence, about the inner member 2. Should the inner member 1 rotate in the opposite direction with respect to the outer member 2 the actions of the roller bearings 33 and 36 are reversed and it is the roller bearings 36 which effect a locking action between the annular ring 29 and the reaction ring 30, while the roller bearings 33 rotate freely as the inner member 1 rotates relative to the annular ring 29.

As the annular member 29 is indexed round it causes the rollers 42 to roll over the collapsible hose 40, thereby moving the point of localized compression along the length of the hose 40 and forcing lubricant to be pumped from the end of the hose 40 towards which the rollers 42 are moving into the system of lubricating ducts leading to the bearings 3, 4, 22 and 23. Lubricant displaced from the bearings is returned to the other end of the collapsible hose 40.

It will be understood that the indexing mechanism described hereinabove for rotating the annular member is responsive to the slightest movement of the inner member 1 relative to the outer member 2, and further, that there is no lost motion as there is with convention ratchet type mechanism where the relative movement of the inner and outer members must be at least equal to the pitch of the ratchet teeth to index the pump round.

The pump of the swivel joint of the present invention is capable of developing relatively high pressures, of the order of 10 p.s.i. Unlike known swivel joints there is little if any likelihood of the lubricant leaking back past the pumping means and therefore the efficiency of the swivel joint in pumping lubricant to the bearings is further improved.

What is claimed is:

1. A swivel joint for interconnecting two lengths of pipe, comprising an inner annular member adapted, in use, to be connected to a first length of pipe and an outer annular member co-axial with the inner annular member, and adapted, in use, to be connected to a second length of pipe, bearing means locating the inner and outer members for relative rotary movement with respect to one another, a lubricant reservoir, means for connecting the lubricant reservoir to the bearing means and pump means driven by relative rotary movement between the inner and outer annular members for pumping lubricant from the lubricant reservoir to the bearing means wherein the lubricant reservoir comprises a collapsible hose, and the pump means comprises means for effecting a peristaltic action in the hose as a result of relative rotary movement of the inner and outer annular member, thereby causing lubricant to be displaced from the hose towards the bearing means.

2. A swivel joint according to claim 1, wherein the pump means comprises an annular ring which is disposed between the inner and outer annular members, and is rotatably driven by relative rotary movement of the inner and outer annular members, which annular ring carries means for effecting localized closure of the internal bore of the hose effecting said peristaltic action.

3. A swivel joint according to claim 2, wherein the means for effecting localized closure of the collapsible hose comprises at least one roller which acts on the surface of the hose.

4. A swivel joint according to claim 2, wherein the said annular ring is rotatably driven by a non-return drive means.

5. A swivel joint according to claim 4, wherein the non-return drive means comprises at least one first roller bearing located between the outer circumference of the inner annular member and an inner circumference of the annular ring in a first tapered slot provided with resilient biasing means which acts to bias said at least one first roller bearing out of the first tapered slot, and at least one second roller bearing located between the outer circumference of the annular ring and an inner circumference of one of the outer annular member and a fixed reaction ring carried by the outer annular member, said at least one second roller bearing being positioned in a taper slot tapered in the opposite direction to the first tapered slot and provided with resilient biasing means to bias said at least one second roller bearing out of the tapered slot in the opposite direction to the at least one first roller bearing.

6. A swivel joint according to claim 1, wherein the means for connecting the lubricant reservoir to the bearing means comprises a system of bores or ducts in the outer annular member which system of bores or ducts is connected to both ends of the lubricant reservoir so that lubricant can be pumped through the system in both directions with equal effectiveness.

7. A swivel joint for interconnecting two lengths of pipe, comprising an inner annular member adapted, in use, to be connected to a first length of pipe, and an outer annular member co-axial with the inner annular member adapted, in use, to be connected to a second length of pipe, bearing means for locating the inner and outer annular members for relative rotary movement with respect to one another, an annular lubricant reservoir located between the inner and outer annular members means for connecting the lubricant reservoir to the bearing means and pump means driven by the relative rotary movement between the inner and outer annular members for pumping lubricant from the lubricant reservoir to the bearing means, wherein an annular ring is disposed between the inner and outer annular members and is rotatably driven by relative rotary movement of the inner and outer annular members, which annular ring drives one of an eccentric ring and cam pump located in the annular lubricant reservoir and causes it to sweep the annular lubricant reservoir and force lubricant towards the bearing means, said annular ring being driven by a non-return drive means that includes at least one first roller bearing located between the outer circumference of the inner annular member and an inner circumference of the annular ring in a first tapered slot provided with resilient biasing means which acts to bias said first roller bearing out of the first tapered slot, and at least one second roller bearing located between the outer circumference of the annular ring and one of an internal circumference of the outer annular member and a fixed reaction ring carried by the outer annular member, said at least one second roller bearing being positioned in a second tapered slot tapered in the opposite direction to the first tapered slot and provided with resilient biasing means to bias the said at least one second roller bearing out of the second tapered slot in the opposite direction to the at least one first roller bearing.

* * * * *